(12) United States Patent
Bhaskaran et al.

(10) Patent No.: US 9,815,293 B2
(45) Date of Patent: Nov. 14, 2017

(54) INK LEVEL BASED PRINTING

(71) Applicant: HEWLETT-PACKARD DEVELOPMENT COMPANY, L.P., Houston, TX (US)

(72) Inventors: Shinoj Bhaskaran, Bangalore (IN); Ruby Tomar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/126,697

(22) PCT Filed: Jul. 7, 2014

(86) PCT No.: PCT/US2014/045548
§ 371 (c)(1),
(2) Date: Sep. 16, 2016

(87) PCT Pub. No.: WO2015/142377
PCT Pub. Date: Sep. 24, 2015

(65) Prior Publication Data
US 2017/0087866 A1     Mar. 30, 2017

(30) Foreign Application Priority Data

Mar. 17, 2014  (IN) ............ 1403/CHE/2014

(51) Int. Cl.
*B41J 2/175* (2006.01)
(52) U.S. Cl.
CPC ................ *B41J 2/17566* (2013.01)
(58) Field of Classification Search
CPC .................................................. B41J 2/17566
See application file for complete search history.

(56) References Cited

U.S. PATENT DOCUMENTS

| 5,706,037 A | 1/1998 | McIntyre |
| 6,789,883 B2 | 9/2004 | Heim et al. |
| 6,991,819 B2 | 1/2006 | Zerza et al. |
| 8,223,358 B2 | 7/2012 | Czyszcewski et al. |
| 8,233,190 B2 * | 7/2012 | Bostick .............. H04N 1/60 347/86 |
| 8,485,622 B2 * | 7/2013 | Ogasawara ........... B41J 2/175 347/19 |
| 8,851,617 B1 * | 10/2014 | Sjoberg .............. B41J 2/17596 347/19 |
| 9,132,656 B2 * | 9/2015 | Nicholson, III ..... B41J 2/17566 |
| 2002/0042884 A1 | 4/2002 | Wu et al. |
| 2004/0207878 A1 | 10/2004 | Ferlitsch |
| 2009/0046115 A1 | 2/2009 | Seacat et al. |
| 2009/0167813 A1 | 7/2009 | Mitchell et al. |
| 2013/0308165 A1 | 11/2013 | Venkatesh et al. |

FOREIGN PATENT DOCUMENTS

JP     2009137024 A     6/2009

OTHER PUBLICATIONS

Automated Optical Disc Duplication & Printing System, (Research Paper), Apr. 4, 2012, found at http://www.cdrom2go.com/pdfs/PRIMERA_BravoXR_manual.pdf.

* cited by examiner

*Primary Examiner* — Lamson Nguyen
(74) *Attorney, Agent, or Firm* — HP Inc. Patent Department (57) ABSTRACT

Example embodiments relate to ink level based printing. The level of ink available in a printing device is monitored. If the ink level is at or below a pre-defined threshold, a print job is printed according to a user-defined rule.

22 Claims, 6 Drawing Sheets

INK LEVEL BASED PRINTING

BACKGROUND

Printing is one of the earliest known inventions. Millions of documents are printed each day around the world using an array of printing technologies. However, printing became a layman's tool with the arrival of computers and the like computing devices such as mobile phones, notebooks, and tablets. People use such devices to print a wide variety of documents such as images, spreadsheets, text document, emails, etc.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Printing has become a common activity nowadays. Portable computing devices and printers have simplified printing to an extent that only a few clicks (via an input device) may be needed to print a variety of content. Most computer applications in fact provide a user interface whereby a user may specify beforehand his or her preferences related to printing of content of a user's choice. Such preferences may relate to, for instance, selection of a printer, type of paper, paper size, number of copies desired to be printed, printing orientation (example, portrait or landscape), number of pages to be printer per sheet, etc. Similar or other options may also be available via a user interface on a printing device that allows a user to define his or her printing preferences prior to printing of a desired content.

However, present computing or printing devices do not allow a user to define a policy (or policies) whereby a user may control or filter content to be printed based on printer ink levels in a printing device. Since printer ink is a valuable resource, there may be many scenarios where a user may like to control the content scheduled to be printed depending on availability of ink in a printing device. To provide an example, a user may like to prevent printing of a print job received from a specific individual (i.e. a sender) when ink levels dip below a certain pre-defined threshold. To provide another example, a user may like to prevent printing of a certain type of content (for instance, large color intensive images) in a print job when ink levels reach or go below a threshold. In other words, there's no present mechanism that allows a user to define beforehand what print jobs may be printed and/or in what manner based on printer ink availability in a printing device.

The proposed solution addresses the above issues and describes printing of a print job based on monitoring of ink level in a printing device. If the ink level is at or below a pre-defined threshold, a print job may be printed according to a user-defined rule.

Figure 1:
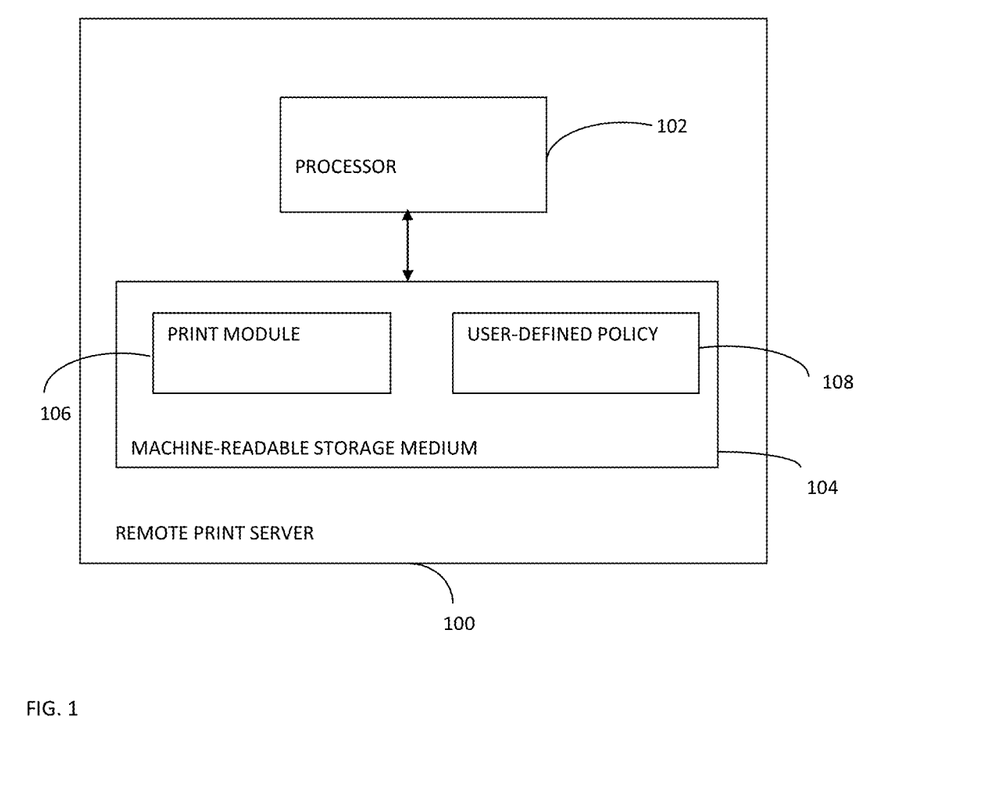
FIG. 1 is a block diagram of an example computing device for ink level based printing.

FIG. 1 is a block diagram of an example computing device 100 for ink level based printing. Computing device 100 may be a desktop computer, a server, a printing device, a notebook computer, a tablet computer, a mobile phone, a personal digital assistant (PDA), and the like. In an example, computing device 100 may be a remote print server 100. Remote print server 100 may include a processor 102 and a machine-readable storage medium 104.

Processor 102 may be any type of Central Processing Unit (CPU), microprocessor, or processing logic that interprets and executes machine-readable instructions stored in machine-readable storage medium 104.

Machine-readable storage medium 104 may be a random access memory (RAM) or another type of dynamic storage device that may store information and machine-readable instructions that may be executed by processor 102. For example, machine-readable storage medium 104 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 104 may be a non-transitory machine-readable medium. In an example, machine-readable storage medium 104 may store a print module 106 and a user-defined rule(s) or policy (or policies) 108. The term "module" may refer to a software component (machine readable instructions), a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. A module may reside on a volatile or non-volatile storage medium (e.g. 104) and configured to interact with a processor (e.g. 102) of a computing device (e.g. 100).

Print module 106 may include instructions to monitor an ink level in a printing device. In an example, print module 106 may include instructions to monitor an ink level in a printer cartridge in a printing device that may be in communication with remote print server 100. Such printing device may be in direct or indirect communication (e.g. via a computer network) with remote print server 100. In an example, print module 106 may monitor an ink level in a remote printing device based on information received or obtained from the remote printing device via a computer network. Print module 106 may process such information to determine whether an ink level in a printing device is at or below a threshold value (or a pre-defined limit). A threshold value for an ink level in a printer cartridge may be defined by a user. In case there are multiple printer cartridges in a printing device, separate threshold values may be defined for ink levels in individual printer cartridges. A threshold value for an ink level may act as a trigger point for a print module 106. For instance, if an ink level in a printing device reaches (or goes below) a threshold value, print module 106 may filter a print job prior to printing based on a user-defined policy (or policies) 108. In an example, a threshold value for an ink level in a printing device may be defined in print module 106. Print module 106 may also include instructions to print a filtered print job on a printing device that may be in direct or indirect communication (e.g. via a computer network) with remote print server 100.

User-defined policy (or policies) 108 may be machine-readable instructions defined by a user to filter a print job received by a computing device (e.g. remote print server 100) if an ink level in a printing device reaches or goes below a threshold value. In an example, user-defined policy (or policies) 108 may be stored in machine-readable storage medium 104 of remote print server 100. In such case, a user-defined policy (or policies) 108 may direct a print module 106 to filter a print job received by remote print server 100 if an ink level in a printing device reaches or goes below a threshold value, wherein the printing device may be in direct or indirect communication (e.g. via a computer network) with remote print server 100.

A user may define various types of policies 108 depending on his or her preference(s). In an example, a user-defined policy 108 may allow or prevent printing of a print job received from a specified user if an ink level in a printing device reaches or goes below a threshold value. To provide an illustration, a user-defined policy may include instructions that if ink level in a printing device reaches or goes below 30% of total ink in a printer cartridge, a print module (e.g. 106) may filter a print job to print content received from a specified individual(s), block printing of print content from other individual(s), or a combination thereof. For example, print jobs provided in the form of email messages (as described below) may be filtered in this manner based on the sender address of the email message.

In another example, a user-defined policy 108 may allow printing of only a specific scheduled print job amongst print jobs scheduled on a computing device (e.g. remote print server 100) for printing on a printing device if an ink level in a printing device reaches or goes below a threshold value. In such case, user-defined policy 102 may block printing of other scheduled print jobs. To provide an illustration, a user-defined policy 108 may include instructions that if ink level in a printing device reaches or goes below 20% of total ink in a printer cartridge, a print module may filter scheduled print jobs to print content scheduled by a specified entity (or entities), for example an e-commerce portal of an ABC company, block printing of print content scheduled from other entities (e.g. a horoscope website), or a combination thereof.

In a yet another example, a user-defined policy 108 may allow printing of a print job at a low quality mode if an ink level in a printing device reaches or goes below a threshold value. To prove an illustration, a user-defined policy 108 may include instructions that if the ink level in a printing device reaches or goes below 10% of total ink in a printer cartridge, a print module may print a print job comprising, for instance, of a large color intensive image(s) at a low quality mode.

It may be noted that aforementioned examples of user-defined policies (or rules) 108 are merely illustrative (i.e. without any limitation) and there may be additional examples. Further, a user-defined policy 108 may be supplemental to an existing system-defined rule for printing on a computing device.

In an example, print module 106 may be executed by processor 102 of remote print server 100 to monitor ink level in a printing device and, if the ink level is at or below a pre-defined threshold, to print a print job by the printing device according to a user-defined rule 108.

Figure 2:
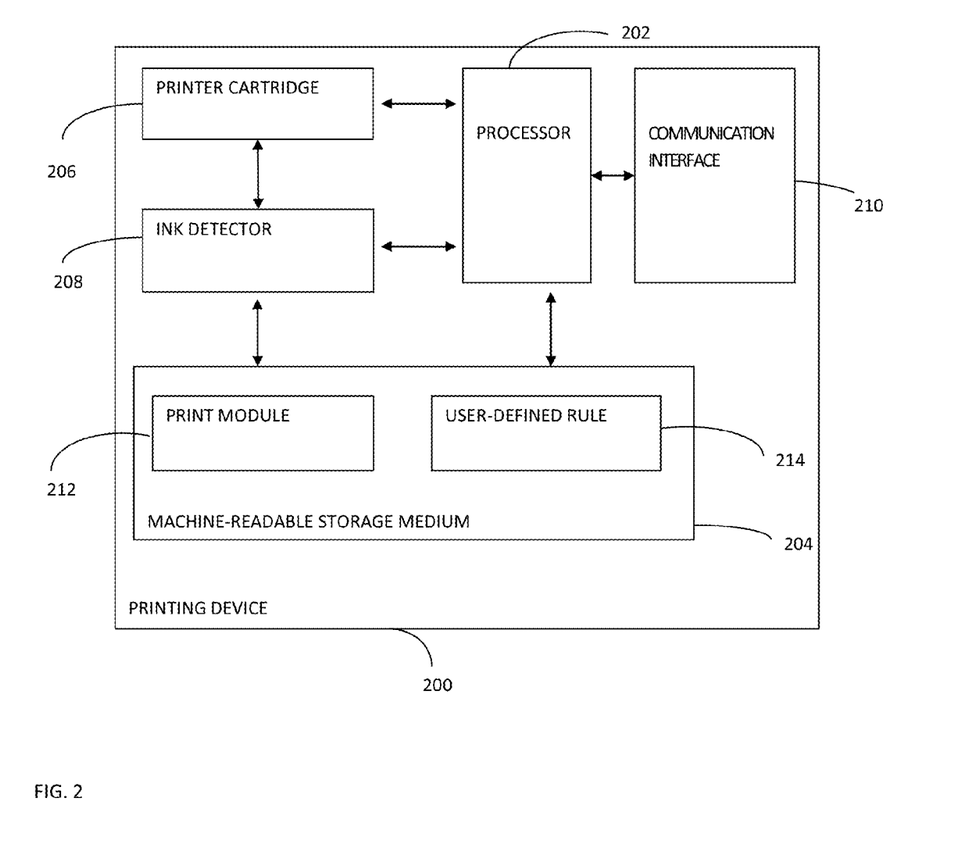
FIG. 2 is a block diagram of an example printing device for ink level based printing.

FIG. 2 is a block diagram of an example printing device 200 for ink level based printing. Printing device 200 may be any device which produces a representation of an electronic document on a physical medium such as paper, fabric, etc. Some non-limiting examples of printing device 200 may include a dot-matrix printer, an inkjet printer, a laser printer, etc. In some examples, printing device 200 may be a multifunction printer (MFP), also known as multi-function device (MFD), or all-in-one (AIO) printer. An MFP can print, scan, and copy among their many features. Printing device 200 may include a processor 202, a machine-readable storage medium 204, a printer cartridge 206, an ink detector 208, and a communication interface 210. The aforementioned components of the printing device 200 may be communicatively coupled through a system bus.

Processor 202 may be any type of Central Processing Unit (CPU), microprocessor, or processing logic that interprets and executes machine-readable instructions stored in machine-readable storage medium 204.

Machine-readable storage medium 204 may be a random access memory (RAM) or another type of dynamic storage device that may store information and machine-readable instructions that may be executed by processor 202. Machine-readable storage medium 204 may be similar to machine-readable storage medium 104 described above. In an example, machine-readable storage medium 204 may store a print module 212 and a user-defined rule(s) or policy (or policies) 214.

Print module 212 may include instructions to monitor an ink level in printer cartridge 206 in printing device 200. In an example, print module 212 may monitor an ink level in printing device 200 based on information received or obtained from ink detector 208. Print module 212 may process such information to determine whether an ink level in printing device 200 is at or below a threshold value (or a pre-defined limit). A threshold value for an ink level in a printer cartridge may be defined by a user. In case there are multiple printer cartridges (not illustrated) in printing device 200, separate threshold values may be defined for ink levels in individual printer cartridges. A threshold value for an ink level may act as a trigger point for a print module 212. For instance, if an ink level in a printing device reaches (or goes below) a threshold value, print module 212 may filter a print job prior to printing based on a user-defined policy (or policies) 214. In an example, a threshold value for an ink level in a printing device may be defined in print module 212. Print module 212 may also include instructions to print a filtered print job on printing device 200.

User-defined policy (or policies) 214 may be stored in machine-readable storage medium 204 of printing device 200. User-defined policy (or policies) 214 may be machine-readable instructions defined by a user for a print module 212 to filter a print job received by printing device 200 if an ink level in printer cartridge 206 in printing device 200 reaches or goes below a threshold value. Examples of user-defined policy (or policies) 214 may be similar to user-defined policy 108 described above.

Printer cartridge 206 may be a reservoir that contains printer ink (or powder) for printing a print job (e.g. content) on a physical medium such as paper, fabric, etc. Printer cartridge 206 may be an ink cartridge or toner cartridge. Printer cartridge 206 may be a single color ink cartridge or multi-color ink cartridge (comprising of multiple reservoirs each containing an ink of a different color). Although only one printer cartridge 206 is shown in printing device 200 of FIG. 2, other examples may include multiple printer cartridges. Ink detector 208 may determine the type and/or level of ink in printer cartridge 206. In an example, ink detector 208 is a sensor that may measure and/or detect the level of ink and/or color of ink available in a printer cartridge 206. The information (i.e. parameters) collected by ink detector 208 may be provided to processor 202 which in turn may store said information in a machine-readable storage medium 204 of printing device 200.

Communication interface 210 may be used to communicate with another computing device such as a notebook computer, a desktop computer, a mobile device, a tablet, and the like. Communication interface 210 may include any transceiver-like mechanism that enables printing device to communicate with other devices and/or systems via a communication link. Communication interface 210 may be a software program, a hard ware, a firmware, or any combination thereof. Communication interface 210 may use a variety of communication technologies to enable communication between printing device and another computing device over a network (wired or wireless). To provide a few non-limiting examples, communication interface 210 may be an Ethernet card, a modem, an integrated services digital network ("ISDN") card, etc. In an example, communication interface 210 may receive print content from a computing device via direct or network-enabled communication between the computing device and printing device 200.

In an example, print module 212 may be executed by processor 202 to monitor ink level in printer cartridge 206 in printing device 200 and, if the ink level is at or below a pre-defined threshold, to print a print job according to a user-defined rule 214.

Figure 3:
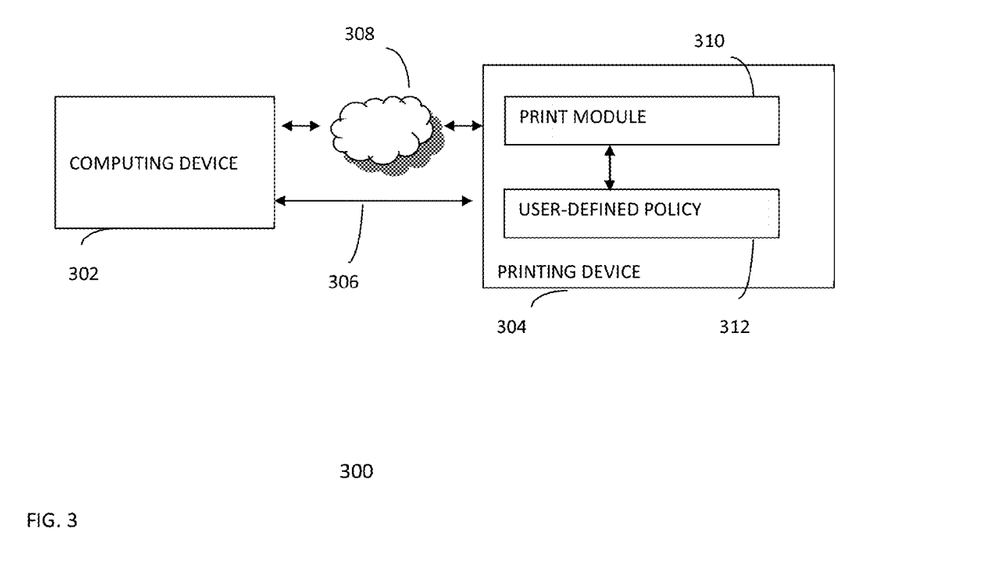
FIG. 3 is a block diagram of an example computing environment for ink level based printing.

FIG. 3 is a block diagram of an example computing environment 300 for ink level based printing. Computing environment 300 may include a computing device 302 and a printing device 304. Computing device 302 may be in direct communication 306 with printing device 304 or via a computer network 308. Such a computer network 308 may be a wireless or wired network. Such a computer network 308 may include, for example, a Local Area Network (LAN), a Wireless Local Area Network (WAN), a Metropolitan Area Network (MAN), a Storage Area Network (SAN), a Campus Area Network (CAN), or the like. Further, such a computer network 308 may be a public network (for example, the Internet) or a private network (for example, an intranet).

Computing device 302 may be a desktop computer, a server, a notebook computer, a tablet computer, a mobile phone, a personal digital assistant (PDA), and the like. In an example, computing device 302 may send print content to printing device 304 for printing via direct communication 306 or computer network 308. Some non-limiting examples of print content may include images, spreadsheets, text document, emails, presentations, etc.

Printing device 304 may be any device which produces a representation of an electronic document on a physical medium such as paper. In an example, printing device 304 may be similar to printing device 200 described earlier. Accordingly, components of printing device 304 that are similarly named and illustrated in printing device 200 may be considered similar. In an example, printing device 304 may receive print content from computing device 302 via direct communication 306 or computer network 308. Print module 310 may determine the ink level in printing device 304 and, if the ink level in the printing device 304 is at or below a pre-defined limit, filter the print content based on a user-defined policy 312. The filtered print content may be printed by the printing device 304. In an example, print module and/or user-defined policy may instead be present in a machine-readable storage medium of computing device 302. In such case, the aforementioned functionalities of print module and user-defined policy may be performed in computing device 302.

Figure 4:
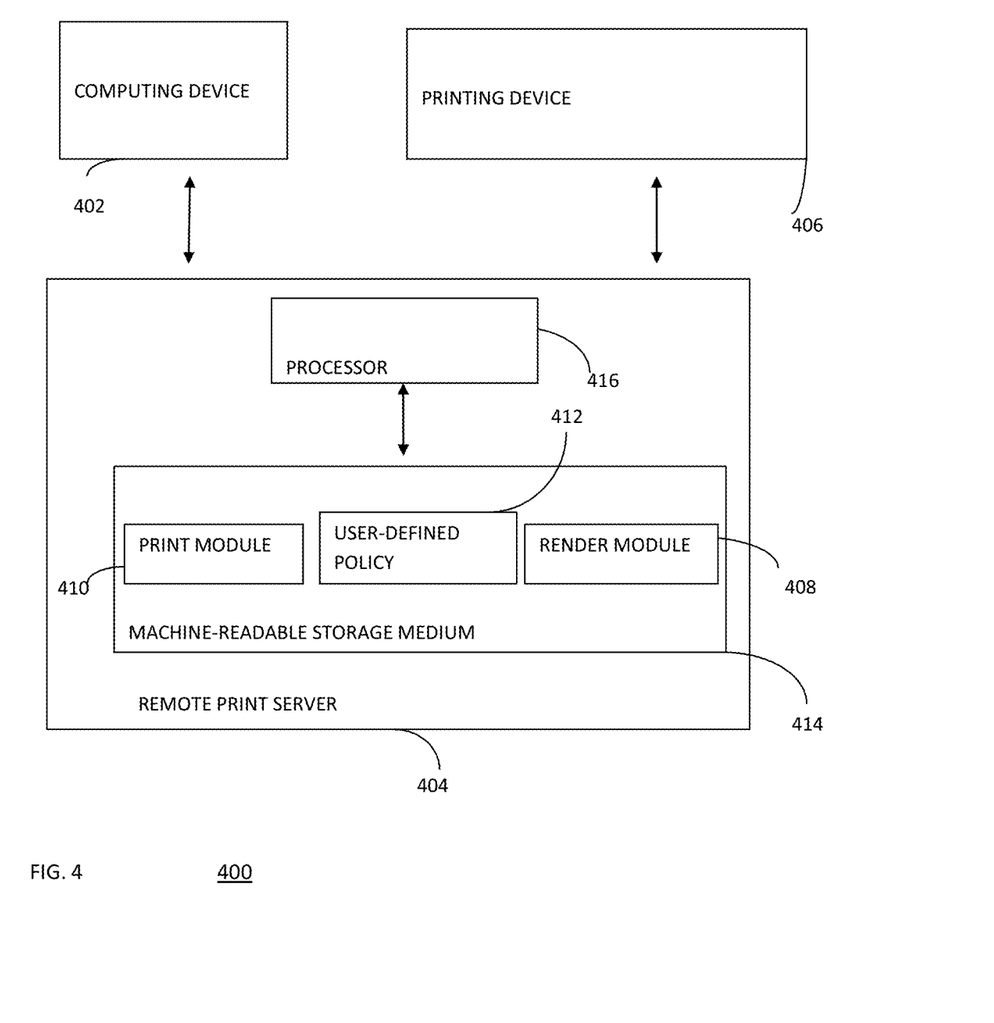
FIG. 4 is a block diagram of an example computing environment for ink level based printing.

FIG. 4 is a block diagram of an example computing environment 400 for ink level based printing. Computing environment 400 may include a computing device 402, a remote server 404, and printing device 406. Computing device 402 may be in communication with remote server 404 via a computer network. Such a computer network may be similar to the computer network described above. Remote server 404 may be in communication with printing device 406 via a computer network. Such a computer network may be similar to the computer network described above.

Computing device 402 may be similar to computing device 302 as described above. In an example, computing device 402 may send a print job to remote print server 404 for printing on printing device 406.

Remote print server 404 may be similar to remote print server 100 described earlier. Accordingly, components of remote print server 404 that are similarly named and illustrated in remote print server 100 may be considered similar. Remote print server 404 may receive a print job from computing device 402 for printing by a printing device (e.g. 406). In the example of FIG. 4, remote print server 404 may include a render module 408 on machine-readable storage medium 414 to render a print job received from a computing device (e.g. 402) into a print format that may be acceptable to a printing device (e.g. 406) for printing the print job.

Printing device 406 may be any device which produces a representation of an electronic document on a physical medium such as paper. In an example, printing device 402 may be similar to printing device 200 described earlier. Printing device 406 may receive a print job for printing from a computing device (e.g. 402) via remote print server (e.g. 404).

In an example, remote print server 404 may receive a print job from computing device 402 for printing by printing device 406. In an instance, such print job may include an email (or an attachment included in an email) along with an email address of a printing device (e.g. 406) for printing. For example, server 404 may (directly or indirectly) receive a print job provided in the form of an email message (e.g., with attached content to be printed) addressed to an email address assigned (e.g., in a database accessible to server 404) to printing device 406. Upon receipt of such a print job, render module 408 on remote print server 404 may be executed by processor 416 to render the print job into a print format that may be acceptable to a printing device (e.g. 406) for printing the print job. Print module 410 on remote print server may determine the ink level in printing device 406 and, if the ink level in the printing device 406 is at or below a pre-defined limit, filter the print job based on a user-defined policy 412 as described above. For example, if the ink level in the printing device 406 is at or below a pre-defined limit, print module 410 may filter print jobs based on at least one user-defined policy 512 indicating whether to print schedule print jobs from various senders, as described above. For print jobs provided as email messages, for example, if the ink level in the printing device 406 is at or below a pre-defined limit, print module 410 may block print jobs from at least one sender email address based on at least one user-defined policy 512, may continue to print print jobs from at least sender email address based on at least one other user-defined policy 512, or a combination thereof. For print jobs to be printed after the filtering process (e.g., "filtered" print jobs), print module 410 may print the filtered print job through printing device 406.

Figure 5:
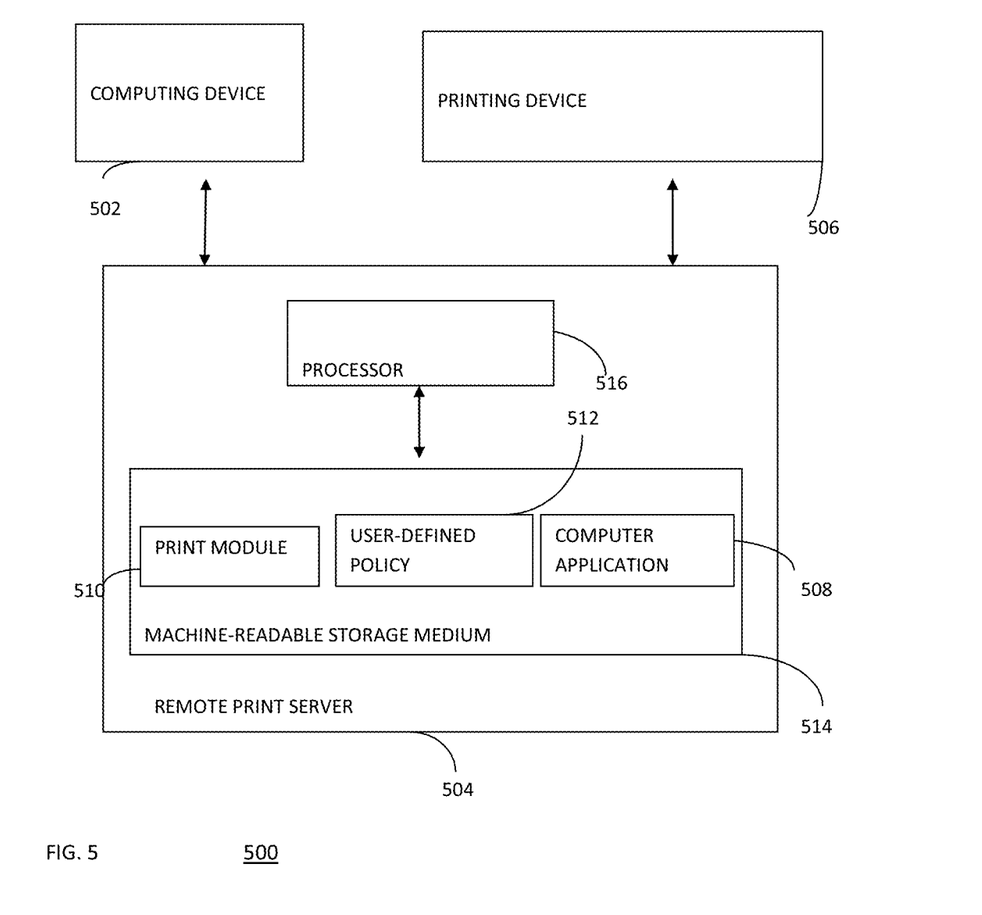
FIG. 5 is a block diagram of an example computing environment for ink level based printing.

FIG. 5 is a block diagram of an example computing environment 500 for ink level based printing. Computing environment may include a computing device 502, a remote server 504, and printing device 506. Computing device 502 may be in communication with remote server 504 via a computer network. Such a computer network may be similar to the computer network described above. Remote server 504 may be in communication with printing device 506 via a computer network. Such a computer network may be similar to the computer network described above.

Computing device 502 may be similar to computing device 302 as described earlier. In an example, computing device 502 may send a print job to remote print server 504 for printing on printing device 506.

Remote print server 504 may be similar to remote print server 100 described earlier. Accordingly, components of remote print server 504 that are similarly named and illustrated in remote print server 100 may be considered similar. In the example of FIG. 5, remote print server 504 may include a computer application (machine-executable instructions) 508 on machine-readable storage medium 514, wherein the computer application 508 may be executed by processor 516 to create and schedule a print job for printing by a printing device (e.g. 506). Although only one computer application is shown in FIG. 5, in other examples, remote print server may include more than one computer application 508. Thus, in an instance, multiple print jobs may be created by a computer application(s) 508 on remote print server 504 which may schedule printing of such multiple print jobs on printing device 506.

Printing device 506 may be any device which produces a representation of an electronic document on a physical medium such as paper. In an example, printing device 506 may be similar to printing device 200 described earlier. Printing device 506 may receive a print job for printing from a computing device (e.g. 502) via remote print server (e.g. 504).

As mentioned earlier, multiple print jobs may be created by a computer application(s) 508 on remote print server 504 which may schedule printing of such multiple print jobs on printing device 506. In an example, prior to printing of such scheduled print jobs, print module 510 on remote print server 504 may determine the ink level in printing device 506 and, if the ink level in the printing device 506 is at or below a pre-defined limit, filter the scheduled print jobs based on a user-defined policy 512 as described above. For example, if the ink level in the printing device 506 is at or below a pre-defined limit, print module 510 may filter the scheduled print jobs based on at least one user-defined policy 512 indicating whether to print schedule print jobs from different entities, as described above. For example, if the ink level in the printing device 506 is at or below a pre-defined limit, print module 510 may block print jobs from at least one entity based on at least one user-defined policy 512, may continue to print print jobs from at least entity based on at least one other user-defined policy 512, or a combination thereof. For print jobs to be printed, print module 510 may print the filtered print job through printing device 506.

Although only one computing device and one printing device are shown in FIGS. 3, 4, and 5, in other examples, computing environment 300, 400, or 500, may include more than one computing device and/or more than one printing device.

Figure 6:
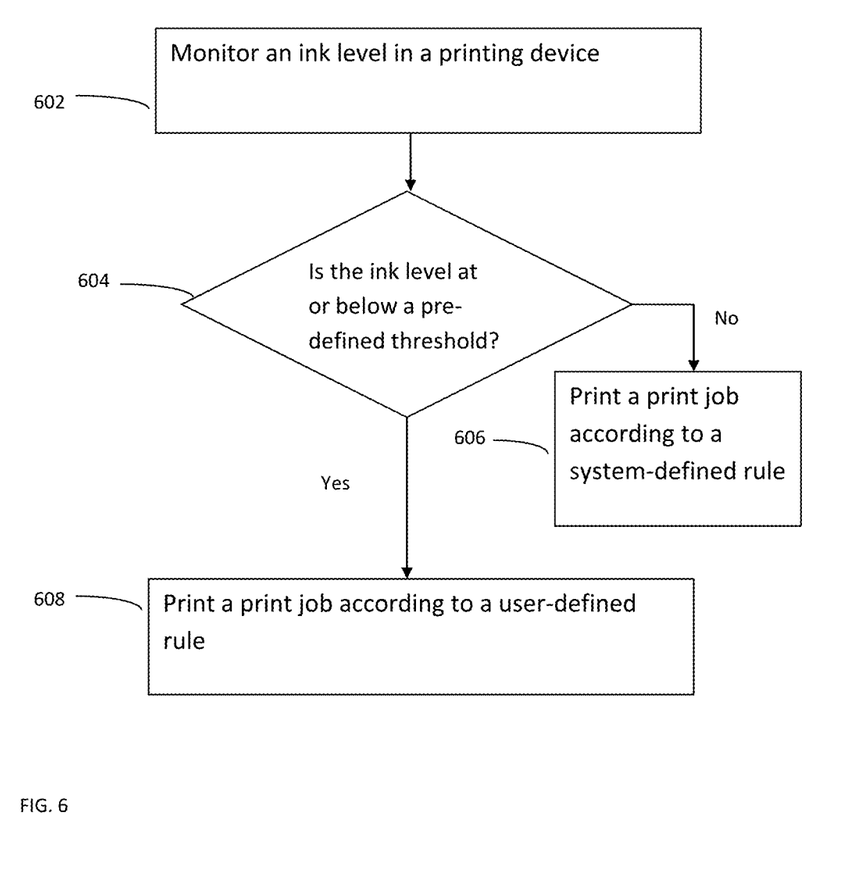
FIG. 6 is a flowchart of an example method for ink level based printing.

FIG. 6 is a flowchart of an example method 600 for an ink level based printing. The method 600, which is described below, may at least partially be executed on computing device of FIG. 1, 3, 4, or 5, and/or printing device of FIG. 2, 3, 4 or 5. However, other printing or computing devices may be used as well. At block 602, a print module (for example, 212) may monitor the level of ink and/or color of ink available in a printer cartridge (for example, 206) in a printing device (for example, 200). In case there are multiple printer cartridges in the printing device, a print module (for example, 212) may monitor the level of ink and/or color of ink available in each of the printer cartridges. In an example, a print module (for example, 212) may monitor the level of ink and/or color of ink available in a printer cartridge (for example, 206) through an ink detector (for example, 208) in a printing device (for example, 200). At block 604, print module (for example, 212) may determine whether the ink level in the printer cartridge is at or below a pre-defined threshold. At block 606, if the ink level in the printer cartridge is not at or below a pre-defined threshold, print module (for example, 212) may print a print job according to a system-defined rule. At block 608, if the ink level in the printer cartridge is at or below a pre-defined threshold, print module (for example, 212) may print a print job according to a user-defined rule.

For the purpose of simplicity of explanation, the example method of FIG. 6 is shown as executing serially, however it is to be understood and appreciated that the present and other examples are not limited by the illustrated order. The example systems of FIGS. 1 to 5, and method of FIG. 6 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A non-transitory machine-readable storage medium comprising instructions executable by a processor of a remote print server, comprising:
   a print module to monitor an ink level in a printing device; and
   the print module to automatically filter a print job, based on a predefined user-defined policy, if a usable amount of ink remains in the printing device but the ink level is at or below a pre-defined limit.

2. The storage medium of claim 1, wherein the print job is received from a computing device.

3. The storage medium of claim 1, further comprising a render module to render the print job into a print format acceptable to the printing device for printing the print job.

4. The storage medium of claim 3, wherein the print job is provided in the form of an email message.

5. The storage medium of claim 4, wherein the email message includes an email address of the printing device.

6. The storage medium of claim 1, further comprising an application to create and schedule the print job on the remote print server.

7. The storage medium of claim 1, wherein the print job includes multiple print jobs scheduled for printing by the printing device.

8. The storage medium of claim 1, further comprising the user-defined policy.

9. The storage medium of claim 1, wherein the usable amount of ink is sufficient to print at least a portion of the print job.

10. The storage medium of claim 1, wherein to filter the print job comprises to control whether the print job is to be printed, and if the print job is to be printed, to define the manner in which the print job is to be printed.

11. The storage medium of claim 1, wherein the pre-defined user-defined policy specifies whether to allow or prevent printing of a print job from a specified source.

12. The storage medium of claim 1, wherein the pre-defined user-defined policy specifies whether to allow or prevent printing of a print job having specified print content.

13. The storage medium of claim 1, wherein the pre-defined user-defined policy specifies whether to allow or prevent printing of a print job using a specified printing mode.

14. A printing device, comprising:
an ink detector to determine an ink level in a printer cartridge in the printing device;
a communication interface to receive print content; and
a print module to automatically filter the print content, based on a predefined user-defined rule, if an amount of ink usable to print at least a portion of the print content remains in the printing cartridge but the ink level is at or below a pre-defined limit.

15. The printing device of claim 14, wherein the print module is to instruct the printing device to print the filtered print content.

16. The printing device of claim 14, wherein the printer cartridge is a single color ink cartridge or a multi-color ink cartridge.

17. The printing device of claim 14, wherein the communication interface is to receive the print content from a computing device via direct or network-enabled communication between the computing device and the printing device.

18. The printing device of claim 14, wherein the user-defined rule is to allow or prevent printing of the print content received from a specified user.

19. The printing device of claim 14, wherein the user-defined rule is to allow printing of a specific scheduled print content in the print content and block printing of other scheduled print content in the print content.

20. The printing device of claim 14, wherein the printing device comprises plural print reservoirs for different supplies of ink, and wherein each print reservoir has an independent pre-defined limit of remaining ink in that print reservoir.

21. The printing device of claim 14, wherein the print module is further to automatically filter the print content, based on a different predefined rule, if the ink level in the printer cartridge is above a pre-defined limit of remaining ink.

22. A method for printing, comprising:
monitoring an ink level in a printing device; and
if the ink level is at or below a pre-defined threshold of remaining ink, automatically printing a print job according to a predefined user-defined rule.

* * * * *

UNITED STATES PATENT AND TRADEMARK OFFICE
CERTIFICATE OF CORRECTION

Page 1 of 1

PATENT NO. : 9,815,293 B2
APPLICATION NO. : 15/126697
DATED : November 14, 2017
INVENTOR(S) : Bhaskaran et al.

It is certified that error appears in the above-identified patent and that said Letters Patent is hereby corrected as shown below:

On the Title Page

Item (56), delete "6,991,819" and insert -- 6,991,319 --, therefor.

Signed and Sealed this
Nineteenth Day of November, 2019

Andrei Iancu
*Director of the United States Patent and Trademark Office*